(12) United States Patent
Yamashita et al.

(10) Patent No.: US 8,417,437 B2
(45) Date of Patent: Apr. 9, 2013

(54) CONTROL METHOD AND SYSTEM OF ENGINE

(75) Inventors: Hiroyuki Yamashita, Hiroshima (JP); Masatoshi Seto, Hiroshima (JP); Yusuke Kawai, Hiroshima (JP)

(73) Assignee: Mazda Motor Corporation (JP)

( * ) Notice: Subject to any disclaimer, the term of this patent is extended or adjusted under 35 U.S.C. 154(b) by 423 days.

(21) Appl. No.: 12/774,481

(22) Filed: May 5, 2010

(65) Prior Publication Data

US 2010/0312455 A1   Dec. 9, 2010

(30) Foreign Application Priority Data

Jun. 3, 2009   (JP) .................................. 2009-133760

(51) Int. Cl.
*B60T 7/12* (2006.01)

(52) U.S. Cl. .................... 701/105; 123/299; 123/305

(58) Field of Classification Search .................. 701/101, 701/104, 105; 123/294, 299, 305, 321, 322
See application file for complete search history.

(56) References Cited

U.S. PATENT DOCUMENTS

| | | | |
|---|---|---|---|
| 5,720,253 A * | 2/1998 | Matoba et al. ................ 123/298 |
| 6,425,367 B1 | 7/2002 | Hiraya et al. |
| 7,360,523 B2 * | 4/2008 | Sloane et al. ................ 123/305 |
| 8,186,329 B2 * | 5/2012 | Wermuth et al. ........ 123/406.19 |
| 8,195,375 B2 * | 6/2012 | Chen et al. .................... 701/103 |
| 2006/0196468 A1 | 9/2006 | Chang et al. |

FOREIGN PATENT DOCUMENTS

WO   2008/118636 A1   10/2008

OTHER PUBLICATIONS

The extended European Search Report dated Aug. 30, 2010; Application No. 10004975.8-2311.

* cited by examiner

*Primary Examiner* — John Kwon
(74) *Attorney, Agent, or Firm* — Studebaker & Brackett PC; Donald R. Studebaker

(57) ABSTRACT

When it is determined that an engine operating condition is in a high-engine load HCCI range (A2) where an engine load is higher than a specified load X1 within a HCCI range A where a compression self combustion is performed, an after-TDC injection F2$s$ is executed at a point T1 when an internal pressure of a combustion chamber drops below a specified pressure Y after the top dead center of an exhaust stroke during a minus valve overlap period NVO during which intake and exhaust valves are both closed. Then, a main injection F2$m$ as a main injection is executed. Accordingly, any improper detonation or deterioration of NOx emission which may be caused by the compression self-ignition combustion in the range where the engine load is relatively high can be prevented.

10 Claims, 6 Drawing Sheets

CONTROL METHOD AND SYSTEM OF ENGINE

BACKGROUND OF THE INVENTION

The present invention relates to a control method and device of an engine which has a homogeneous-charge-compression-ignition (HCCI) combustion mode in which a premixed air-fuel mixture is compressed in a combustion chamber so that a self-ignition of the mixture is performed without requiring spark from a spark plug, and a minus valve overlap period during which an intake valve and an exhaust valve are both closed at a transitional time from an exhaust stroke to an intake stroke of the engine.

Conventionally, as disclosed in U.S. Pat. No. 6,425,367, the compression self-ignition gasoline internal combustion engine, in which a fuel injector to inject fuel directly into a combustion chamber is provided and the air-fuel mixture is compressed by a piston so that a self-ignition of the mixture is performed, is known. Herein, the minus valve overlap period during which an intake valve and an exhaust valve are both closed at a transitional time from an exhaust stroke to an intake stroke is provided, and a first fuel injection from a fuel injector is executed at a point after a closure timing of an exhaust valve and before the top dead center of an exhaust stroke during the minus valve overlap period and a second fuel injection from the fuel injector is executed at a point during an intake stroke.

According to the gasoline engine disclosed in the above-described publication, the combustion chamber is heated by the combusted gas (remaining gas) which has not been exhausted during the minus valve overlap period, and the above-described first fuel injection is executed under this high-temperature condition, so that the injected fuel can be reformed properly to improve the ignitability of the air-fuel mixture.

However, if the first fuel injection is executed at the above-described timing (after the closure timing of the exhaust valve and before the top dead center of the exhaust stoke of the engine) disclosed in the above-described publication in a range where the engine load is relatively high, there is a concern that the injected fuel may combust near at the timing of the top dead center of the exhaust stoke, thereby the combustion chamber may have a too-high temperature and a too-high pressure. This state would possibly cause a detonation (abnormal combustion), such as pre-ignition, which may be initiated by the above-described second fuel injection. This state would also prevent the induction of the sufficient amount of air into the combustion chamber during the intake stroke, so that there is a concern that the combustion temperature may increase so much that the NOx emission would deteriorate.

SUMMARY OF THE INVENTION

The present invention has been devised in view of the above-described matters, and an object of the present invention is to provide a control method or a control device of an engine which can effectively prevent any improper detonation or deterioration of the NOx emission which may be caused by the compression self-ignition combustion in the range where the engine load is relatively high.

According to the present invention, there is provided a control method of an engine which has a homogeneous-charge-compression-ignition (HCCI) combustion mode in which a premixed air-fuel mixture is compressed in a combustion chamber so that a self-ignition of the mixture is performed without requiring spark from a spark plug, and a minus valve overlap period during which an intake valve and an exhaust valve are both closed at a transitional time from an exhaust stroke to an intake stroke, the method comprising determining a high-engine load range where an engine load is higher than a specified load in the homogeneous-charge-compression-ignition (HCCI) combustion mode, executing a first fuel injection from a fuel injector in the high-engine load range at a point when an internal pressure of the combustion chamber drops below a specified pressure after the top dead center of the exhaust stroke during the minus valve overlap period, and executing a second fuel injection from the fuel injector in the high-engine load range at a point after an execution timing of the first fuel injection.

According to the present invention, since the first fuel injection is executed when the internal pressure of the combustion chamber drops to a certain degree after the exhaust top dead center, the injected fuel evaporates without combusting, so that the inside of the combustion chamber is cooled down properly by its evaporation heat. Then, the second fuel injection is executed subsequently under this state of the cooled combustion chamber. Thereby, any improper detonation, such as pre-ignition, can be effectively prevented in the high-engine load range in the homogeneous-charge-compression-ignition (HCCI) combustion mode by restraining the ignitability of the air-fuel mixture properly. Further, since the above-described cooling down of the inside of the combustion chamber by the first fuel injection promotes the reduction of the internal pressure, thereby the induction of the intake air, the induction volumetric efficiency can improve, and the combustion temperature decreases so properly that the NOx emission can improve.

According to an embodiment of the present invention, the amount of fuel injected through the first fuel injection is set to increase as the engine load becomes higher. Thereby, the cooling function by the first fuel injection can be improved in the high-engine load range where the temperature and internal pressure of the combustion chamber may increase, so that the detonation or the increase of NOx emission in the high-engine load range can be effectively prevented.

According to another embodiment of the present invention, the above-described specified load of the engine load and the specified pressure of the internal pressure of the combustion chamber are set to be lower values respectively as the temperature of cooling water of the engine becomes higher. Thereby, the execution timing of the first fuel injection can be adjusted properly according to the temperature condition of the engine, so that the detonation can be effectively prevented by performing the proper cooling function by the first fuel injection.

According to another embodiment of the present invention, the control method of an engine further comprises determining a low-engine load range where the engine load is lower than the specified load in the homogeneous-charge-compression-ignition combustion mode, executing a first fuel injection from the fuel injector in the low-engine load range at a point before the top dead center of the exhaust stroke during the minus valve overlap period, and executing a second fuel injection from the fuel injector in the low-engine load range at a point after an execution timing of the first fuel injection. Thereby, even in a situation in which the engine load is relatively low so that the self ignition tends not to occur easily, an auxiliary combustion caused by the first fuel injection can increase the temperature inside the combustion chamber. Accordingly, the compression self-ignition combustion caused by the second fuel injection can be effectively promoted, so that the combustion stability can be further improved.

According to another embodiment of the present invention, the amount of fuel injected through the first fuel injection in the low-engine load range is set to decrease as the engine load becomes higher. Thereby, since the combustion energy produced by the first fuel injection decreases according to the engine load, the promotion of combustion with the high temperature inside the combustion chamber can be achieved at an appropriate level according to the engine load, so that the combustion stability in the low-engine load range can be ensured properly.

According to another embodiment of the present invention, the amount of fuel injected through the second fuel injection is greater than that of the amount of fuel injected through the first fuel injection. Thereby, the proper combustion can be provided.

According to another aspect of the present invention, there is provided a control system of an engine which has a homogeneous-charge-compression-ignition combustion mode in which a premixed air-fuel mixture is compressed in a combustion chamber so that a self-ignition of the mixture is performed without requiring spark from a spark plug, and a minus valve overlap period during which an intake valve and an exhaust valve are both closed at a transitional time from an exhaust stroke to an intake stroke, the method comprising a fuel injector to inject fuel into the combustion chamber, a sensor to detect an engine-load operating condition, a sensor to detect an internal pressure of the combustion chamber, and a controller to determine a high-engine load range where an engine load detected by the engine-load operating condition detecting sensor is higher than a specified load in the homogeneous-charge-compression-ignition combustion mode, and control an execution of a fuel injection from the fuel injector, wherein the controller executes a first fuel injection from the fuel injector in the high-engine load range at a point when the internal pressure of the combustion chamber detected by the internal pressure detecting sensor drops below a specified pressure after the top dead center of the exhaust stroke during the minus valve overlap period, and executes a second fuel injection from the fuel injector in the high-engine load range at a point after an execution timing of the first fuel injection.

The control system according to this aspect of the present invention can also provide substantially the same operations and advantages as those of the above-described control method.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
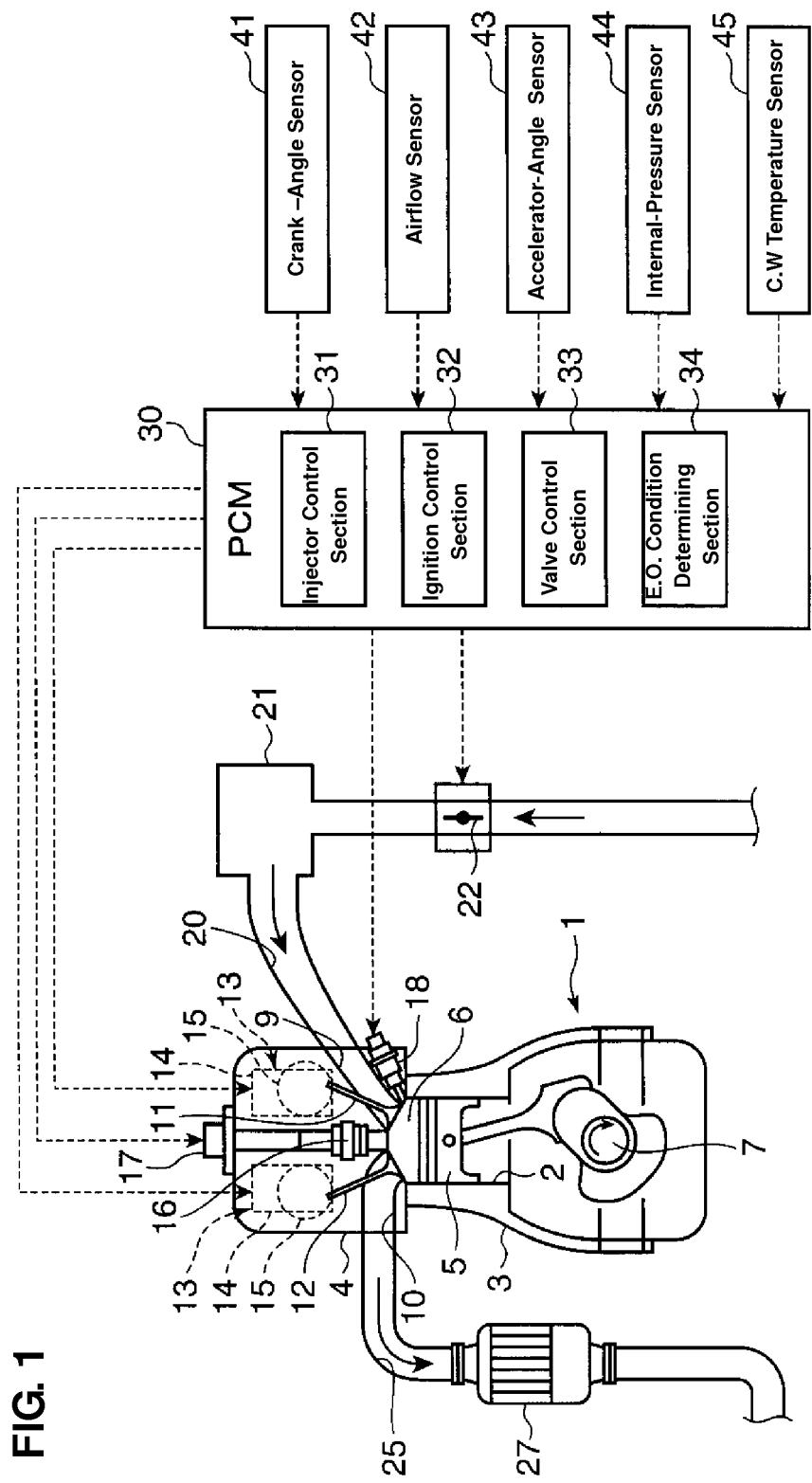
FIG. 1 is a schematic diagram showing a whole constitution of an engine to which a control method of the present invention is applied.

FIG. 1 is a schematic diagram showing a whole constitution of an engine to which a control method of the present invention is applied. The engine shown in this figure, which is a multi-cylinder gasoline engine, comprises an engine body 1 which includes a cylinder block 3 having plural cylinders 2 (only one of them illustrated in FIG. 1) which are arranged in a direction perpendicular to a paper surface, and a cylinder head 4 which is arranged on the cylinder block 3. A piston 5 is inserted into each of the cylinders 2 of the engine body 1, and a combustion chamber 6 having a specified volume is formed between a top face of the piston 5 and a bottom face of the cylinder head 4. The piston 5 is connected to a crank shaft 7 via a connecting rod so that the crank shaft 7 rotates around its axis according to a reciprocating movement of the piston 5.

An intake port 9 and an exhaust port 10 open at a ceiling of the combustion chamber 6, and an intake valve 11 and an exhaust valve 12 which open and close the respective ports 9, 10 are provided at the cylinder head 4. The intake valve 11 and the exhaust valve 12 are driven by respective valve driving mechanisms 13 which comprise a pair of camshafts (not illustrated) provided at the cylinder head 4 and others.

Each of the valve driving mechanisms 13 comprises a VVL 14 as a variable valve lift mechanism and a VVT 15 as a variable valve timing mechanism. The VVL 14 changes the lift amount (valve opening amount) of the valves 11, 12 according to an engine operating condition, and the VVT 15 changes the opening/closing timing (phase angle) of the valves 11, 12 according to the engine operating condition. Herein, since the above-described VVL 14 and VVT 15 are well known, specific descriptions of structures of these mechanisms will be omitted.

Figure 2:
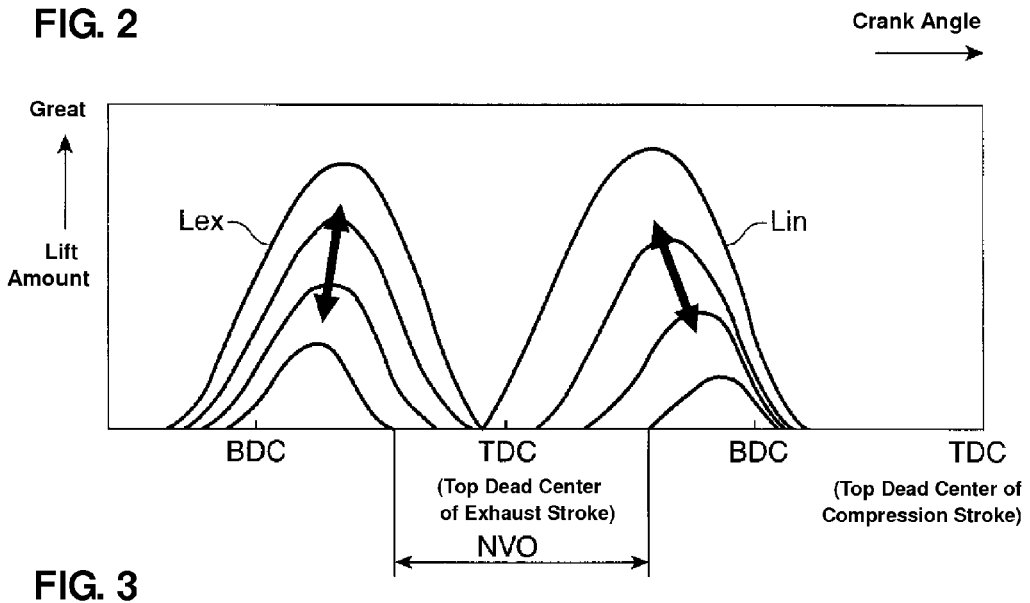
FIG. 2 is a diagram explaining lift characteristics of intake and exhaust valves.

FIG. 2 is a diagram explaining lift characteristics (opening/closing timing and lift amount) of the intake and exhaust valves 11, 12 which are controlled by the VVL 14 and VVT 15. Herein, Lex shows the lift characteristics of the exhaust valve 12, and Lin shows the lift characteristics of the intake valve 11 in FIG. 2. The lift characteristics of the intake and exhaust valves 11, 12 are continuously changeable according to the engine operating condition within a specified range as shown in this figure. Specifically, the lift amount and the valve opening period of the intake and exhaust valves 11, 12 are set respectively so that the lift amount increases and the valve opening period extends as the engine load (required torque) and the engine speed become higher.

The engine of the present embodiment, which has the valves 11, 12 with the lift characteristics shown in FIG. 2, has a minus valve overlap period (shown by NVO in FIG. 2) during which the intake valve 11 and the exhaust valve 12 are both closed at a transitional time from the exhaust stroke to the intake stroke. This minus valve overlap period is set in a particular engine operating range except the high-engine speed and high-engine load range. The existence of the minus valve overlap period produces a certain amount of combusted gas remaining inside the combustion chamber 6 of the cylinder 2, so that a high-temperature condition where the self ignition of the air-fuel mixture tends to occur easily is generated in the combustion chamber 6. Herein, an operation of having the combusted gas remain in the combustion chamber 6 by controlling the intake and exhaust valves 11, 12 described above will be referred to as an internal EGR in the present specification.

Returning to FIG. 1, a basic structure of the engine will be described. An ignition plug 16 is provided at the cylinder head 4 of the engine body 1 so as to open in the combustion chamber 6. A spark (spark ignition) is generated from the ignition plug 16 at a specified timing by an electricity supply from an ignition circuit 17.

Further, an injector 18 is provided at the cylinder head 4 so as to project into the combustion chamber 6 from the side of the cylinder-head's intake side. The injector 18 injects fuel (gasoline) directly into the combustion chamber 6 during the engine intake stroke and the like so that the injected fuel and the intake air mix together and generate an air-fuel mixture having a required air-fuel ratio.

An intake passage 20 for the induction of the air (fresh air) into the combustion chamber 6 is connected to the intake port 9 of the engine body 1. An exhaust passage 25 for the exhaustion of the combusted gas (exhaust gas) generated in the combustion chamber 6 is connected to the exhaust port 10.

A surge tank 21 having a specified volume is arranged at a mid-way portion of the intake passage 20, and a throttle valve 22 is provided upstream of the surge tank 21. Herein, the lift amounts of the intake and exhaust valves 11, 12 are respectively changeable by the control of the VVL 14 as described above in the present embodiment, so the engine output can be controlled by adjusting the intake amount into the combustion chamber 6, without controlling the throttle valve 22. Therefore, the throttle valve 22 operates to close the intake passage 20 at an engine's emergency-stop state, for example, and remains fully open at an engine's normal state, even in a partial-engine load range. This throttle valve 12 remaining fully open can decrease the pumping loss.

A catalyst converter 27 is provided in a mid-way portion of the exhaust passage 25 so as to purify poisonous substances in the exhaust gas flowing down in the exhaust gas 25.

At the engine constituted described above is provided a PCM (Power Control Module) 30 which comprises a well-known CPU, memories and others as a controller.

The PCM 30 is coupled electrically to some sensors and others provided at portions of the engine. Specifically, the PCM 30 comprises a crank-angle sensor 41 to detect an rotational angle (crank angle) of the crank shaft 7, an airflow sensor 42 to detect the amount of intake air flowing down in the intake passage 20, an accelerator-opening sensor 43 to detect an operational amount (accelerator angle) of an accelerator pedal, not illustrated, which is to be pressed by a driver, an internal-pressure sensor 44 to detect an internal pressure inside the combustion chamber 6 of the cylinder 2, and a water-temperature sensor 45 to detect a temperature of the cooling water of the engine. Engine's conditions detected by these sensors 41-45 are inputted to the PCM 30 respectively.

The PCM 30 is also coupled electrically to the above-described VVL 14, VVT 15, ignition circuit 17, injector 18 and throttle valve 22 so as to output control signals to these devices respectively.

Figure 3:
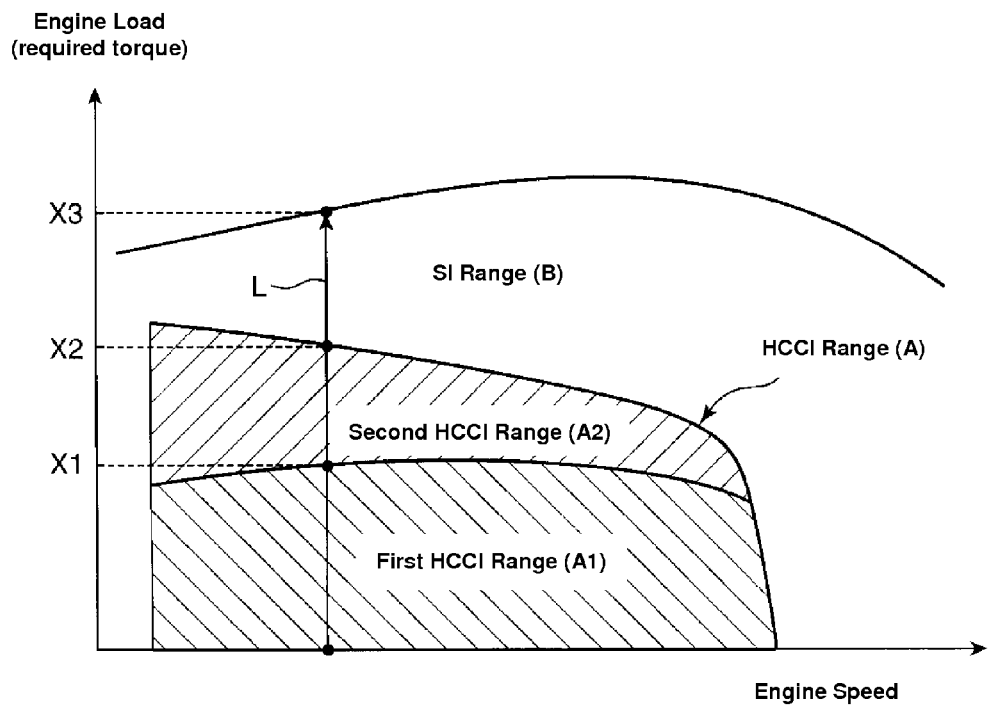
FIG. 3 is an exemplified control map for controlling a combustion of the engine.

FIG. 3 is a control map to be referred by the PCM 30 in controlling the engine. In this figure, a HCCI range A which covers a relatively large area, except the high-engine speed range and the high-engine load ranges, denotes an engine operating range where the compression self-ignition combustion is performed. An SI range B which is set outside the HCCI range denotes another engine operating range where the combustion by the spark ignition is performed. That is, the combustion is controlled so that the mixture (premixed air-fuel mixture) of the fuel injected mainly during the intake stroke is self-ignited near at the top dead center of the compression stroke in the HCCI range A, and that the mixture is ignited by the spark from the ignition plug 16 in the SI range B.

The compression self-ignition combustion performed in the HCCI range A is a type of combustion in which the self ignition occurs at some points concurrently in the combustion chamber 6, which is said to provide a shorter combustion period and a higher thermal efficiency compared with the conventional spark ignition combustion. Further, the compression self-ignition combustion is performed under a lean air-fuel-ratio condition where the air-fuel mixture is diluted by a relatively large amount of the internal EGR, so that the combustion temperature can be properly low and the NOx emission can decrease appropriately.

Meanwhile, the combustion in the SI range B, which is set on the high-speed and high-load side from the HCCI range A, may be necessary because the above-described compression self-ignition combustion has a limit to the engine output or the combustion controllability thereby. That is, since the compression self-ignition combustion is performed under the lean air-fuel-ratio condition described above, the obtained engine output should be limited to some degree, and if the compression self-ignition combustion was forced to be performed under a rich air-fuel-ratio condition, the combustion timing would be improperly advanced, which would lead to the detonation (abnormal combustion). Accordingly, the combustion style is switched from the compression self-ignition combustion to the spark ignition combustion in the SI range B on the high-speed and high-load side of the engine operating condition according to the present embodiment.

The HCCI range A is divided into two ranges A1, A2 depending on a manner of the fuel injection from the injector 18. That is, the first HCCI range A1 is located on a low-engine load side, and the second HCCI range A2 is located on a high-engine load side as shown. In these both ranges A1, A2, the injection timing and the like of the fuel injected from the injector 8 into the combustion chamber 6 are properly adjusted so that the compression self-ignition combustion can be performed. According to the present embodiment, the engine operating area where the compression self-ignition combustion is available is enlarged toward the high-engine load side as much as possible by properly changing the combustion conditions like this. Herein, the above-described first HCCI range A1 corresponds to a "low-engine load range" in the homogeneous-charge-compression-ignition combustion mode of the present invention. Likewise, the above-described second HCCI range A2 corresponds to a "high-engine load range" in the homogeneous-charge-compression-ignition combustion mode of the present invention.

Returning to FIG. 1 again, the specific constitution of the PCM 30 will be descried. The PCM 30 comprises an injector control section 31, an ignition control section 32, a valve control section 33 and an engine operating condition determining section 34.

The injector control section 31 controls the injection operation of the fuel from the injector 18 by controlling the injection period (injection amount) and the injection timing of the fuel injected into the combustion chamber 6.

The ignition control section 32 controls the timing of the ignition spark of the ignition plug 16 and the like by controlling the electricity supply to the ignition plug 16 from the ignition circuit 17. Herein, as described above, according to the present embodiment, since the spark ignition combustion is performed only in the SI range B, and the compression self-ignition combustion is performed in the other range (i.e., the HCCI range A), the electricity supply from the ignition circuit 17 is basically executed only in the SI range B.

The valve control section 33 controls the opening/closing timing and the lift amount of the intake and exhaust valves 11, 12 with the lift characteristics shown in FIG. 2 by controlling the drive of the VVL 14 and the VVT 15.

The engine operating condition determining section 34 reads the engine load (required torque) and the engine speed based on the detection values of the accelerator-angle sensor 43 and the crank-angle sensor 41, and determines where the engine operating condition specified by the read values corresponds in the control map shown in FIG. 3. Results of this determination are reflected on the controls of the control sections 31-33. That is, the controls of driving the respective portions of the engine (the injector 18, ignition circuit 17, VVL 14 and VVT 15, for example) are executed by the injector control section 31, the ignition control section 32, and the valve control section 33 based on the determination results.

Figure 4:
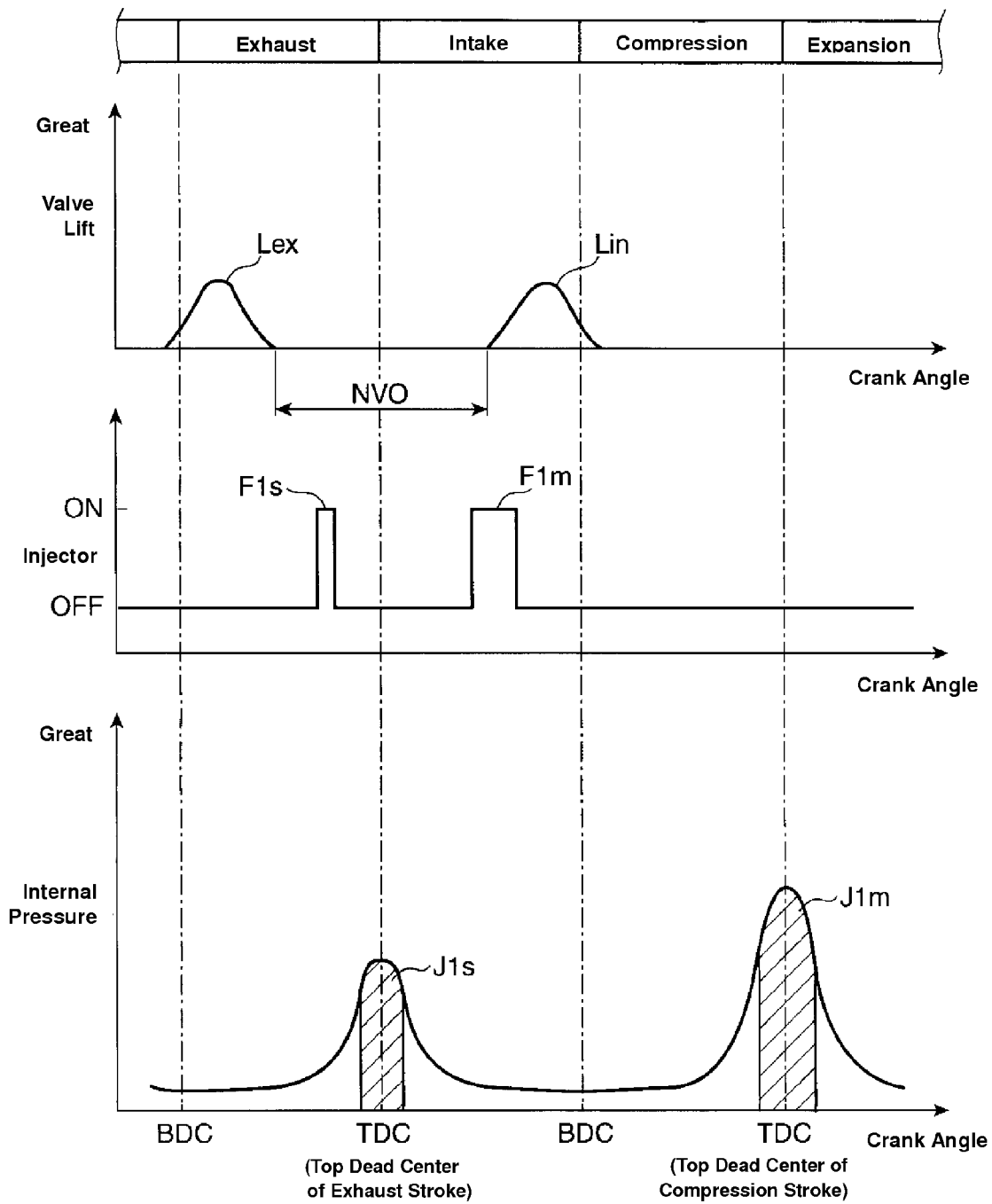
FIG. 4 is a diagram showing contents of a combustion control in a first HCCI range.
Figure 5:
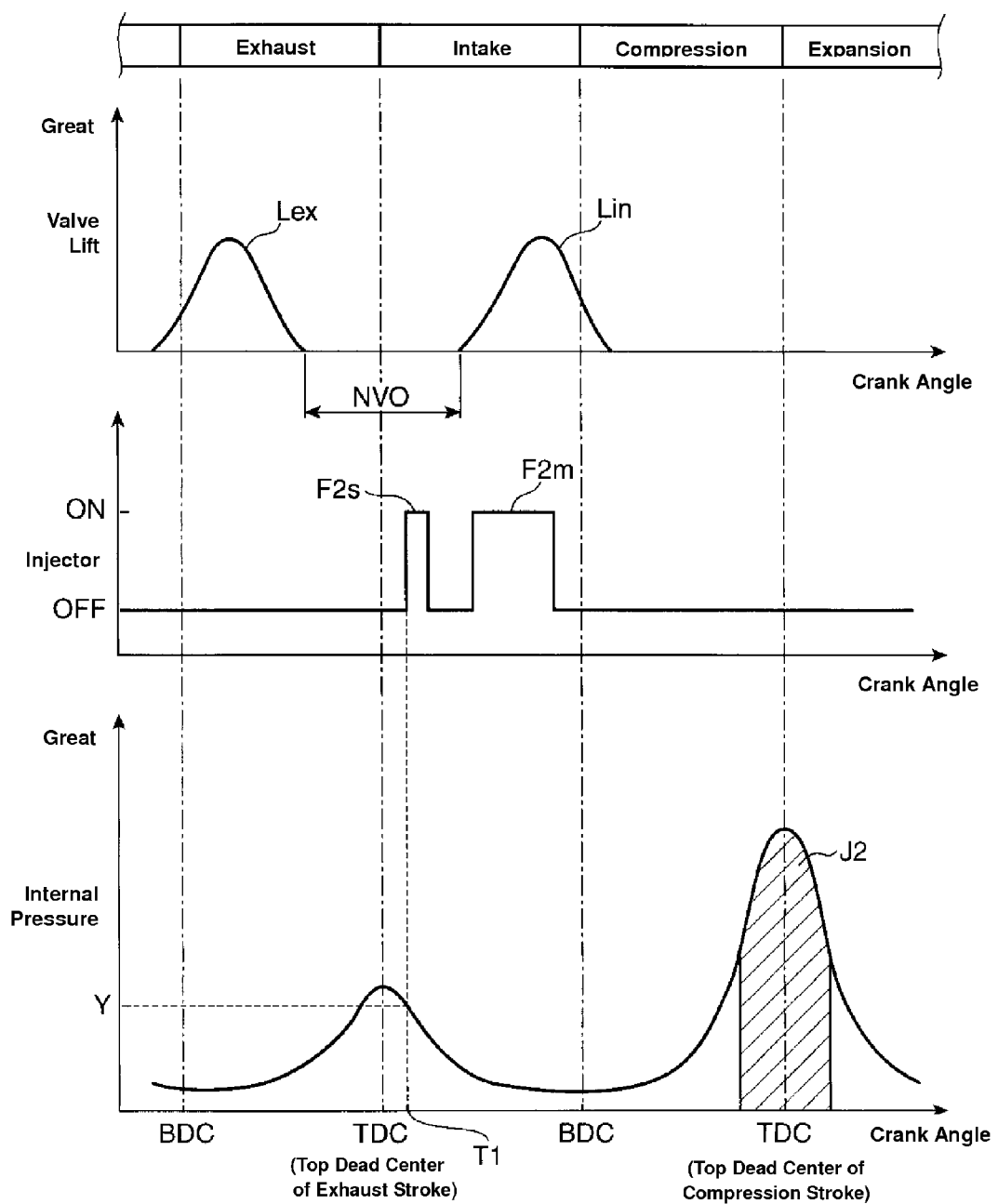
FIG. 5 is a diagram showing contents of a combustion control in a second HCCI range.

Next, the combustion control by the PCM 30 described above will be described specifically with FIGS. 4 and 5. In FIGS. 4 and 5, changes of three states of the lift amount of the valves 11, 12, ON/OFF of the injector 18, and the internal pressure of the combustion chamber are concurrently shown having relationships with the crank angle.

The control of the first HCCI range A1 will be described in FIG. 4. A first fuel injection F1s from the injector 18 in the first HCCI range A1 is executed at a specified point before the top dead center of the exhaust stroke during the minus valve overlap period NVO during which the intake and exhaust valves 11, 12 are both closed. Then, a second fuel injection F1m which injects a larger amount of fuel (i.e., with a longer injection period) than the first fuel injection F1s is executed during the intake stroke at a point when a specified time has passed after the top dead center of the exhaust stroke.

The above-described first fuel injection F1s is executed as an auxiliary fuel injection to increase the temperature of the combustion chamber 6. That is, since the temperature inside the combustion chamber 6 increases near at the top dead center of the exhaust stroke due to the combusted gas remaining during the minus valve overlap period NVO and the compressive function of the piton 5, the fuel injected through the first fuel injection F1s is self-ignited under this high-temperature condition and combusted (J1s), so that the temperature of the combustion chamber 6 is further increased. Then, the fresh air is supplied into the combustion chamber 6 through the intake valve 11 opened during the intake stroke. Herein, in case the compression self-ignition combustion J1s by the first fuel injection F1s occurs, the high temperature of the combustion chamber 6 is maintained near at the top dead center despite induction of the fresh air induction. Thereby, the self ignition of the air-fuel mixture by the second fuel injection F1m is promoted, so that the compression self-ignition combustion J1m can be caused surely. Hereinafter, the first fuel injection F1s executed before the top dead center of the exhaust stroke will be referred to as a "before-TDC injection," and the second fuel injection F1m executed during the intake stroke will be referred to as "main injection."

Herein, the first compression self-ignition combustion J1s by the above-described before-TDC injection F1s is performed under a condition where the amount of oxygen is relatively low after the combustion J1m by the main injection F1m in its previous combustion cycle. The fuel injected through the before-TDC injection F1s is small accordingly, so it is considered that any excessive fuel may not exist at the time of combustion reaction. Moreover, since the energy of the above-described combustion J1s occurring near at the top dead center of the exhaust stroke performs the work by pushing down the piton 5, it can be taken out as the engine output efficiently. That is, the fuel injected through the before-TDC injection F1s not only promotes the compression self-ignition combustion J1m by the main injection F1m following the before-TDC injection F1s, but performs the work through its own combustion reaction.

Next, the control at the second HCCI range A2 will be described referring to F1G. 5. In the second HCCI range A2, as shown in this figure, a first fuel injection F2s from the injector 18 is executed at a specified point after the top dead center of the exhaust stroke during the minus valve overlap period NVO during which the intake and exhaust valves 11, 12 are both closed. Subsequently, a second fuel injection F2m which injects the more fuel (i.e., having the longer injection period) than the first fuel injection F2s is executed during the intake stroke. Hereinafter, the first fuel injection executed in the second HCCI range A2 will be referred to as an "after-TDC injection F2s," and the second fuel injection executed in the second HCCI range A2 will be referred to as a "main injection F2m."

Specifically, the above-described after-TDC injection F2s is executed at a point T1 when the internal pressure of the combustion chamber drops below a specified pressure Y after the top dead center of the exhaust stroke. Herein, dropping below the specified pressure Y is determined by the detection value of the internal-pressure sensor 44. The injected fuel through the after-TDC injection F2s executed at the point T evaporates without combusting, so that the inside of the combustion chamber 2 is cooled down properly by its evaporation heat. Then, the main injection F2m as the second fuel injection is executed subsequently under this state of the cooled combustion chamber, so that the compression self injection combustion J2 by the injected fuel can be caused at the appropriate timing and thereby any improper detonation, such as pre-ignition, can be effectively prevented.

That is, in the second 2HCCI range A2 having the relatively high-engine load, the temperature and pressure in the combustion chamber 6 of the cylinder 2 are so high that the compression self-ignition combustion tends to occur easily. Accordingly, if the necessary fuel has been injected through the main injection F2m at one time, some improper detonation, such as pre-ignition, would occur improperly. Therefore, according to the present embodiment, the after-TDC injection F2s is executed as the auxiliary injection at the point T1 when the internal pressure of the combustion chamber drops below the specified pressure Y, the inside of the combustion chamber is cooled down properly by the evaporation heat of the injected fuel, and then the main injection F2m is executed under this cooled-down condition. Thereby, the ignitability of the air-fuel mixture can be restrained properly, so that any improper detonation, such as pre-ignition, can be effectively prevented.

Further, the internal pressure of the combustion chamber 6 decreases according to the cooling down of the combustion chamber 6 by the after-TDC injection F2s executed right after the top dead center of the exhaust stroke (during the first half of the intake stroke). Accordingly, a large amount of air flows into the combustion chamber 6 while the intake valve 11 opens, so that the induction volumetric efficiency of the engine can improve.

As described above, the purpose of executing the after-TDC injection F2s is to cool down the inside of the combustion chamber 6 prior to the main injection F2m. Therefore, it is necessary that its injection excursion timing is set at the timing where the compression self-ignition may not occur even if the fuel is injected. However, it may be preferable that the after-TDC injection F2s be executed at as near the top dead center of the exhaust stroke as possible from viewpoints of the effective cooling-down of the combustion chamber 6 of the cylinder 2. Therefore, the specified pressure Y to decide the execution timing (the point T1 in FIG. 5) should be set at a higher pressure within the pressure arrange where the self ignition does not occur even if the fuel is injected. By setting the specified pressure Y at this properly high pressure, the after-TDC injection F2s is executed under the relatively high temperature and pressure without the self ignition. Thereby, the injected fuel evaporates quickly before attaching onto the surface of the piton 5 and others, so that the inside of the combustion chamber 6 of the cylinder 2 can be effectively cooled down by its evaporation heat.

The above-described specified pressure Y has different values depending on the engine operating conditions (the engine load and the engine speed) and the engine temperature. Accordingly, the values of the specified pressure Y have been stored in a memory of the PCM 30 as a map data, and corresponding values are read out each time according to the engine load, engine speed and the cooling-water temperature (i.e., the detection values of the accelerator-opening sensor 43, crank-angle sensor 41, and temperature sensor 45).

For example, the specified pressure Y may be set to a lower value as the cooling-water temperature of the engine increases. This is because in case the cooling-water temperature of the engine is high, the temperature inside the combustion chamber 6 is also high so that the self ignition tends to occur easily. Accordingly, unless the fuel is injected after the temperature inside the combustion chamber has decreased, the self ignition may occur so that the proper cooling function may not be obtained.

Figure 6:
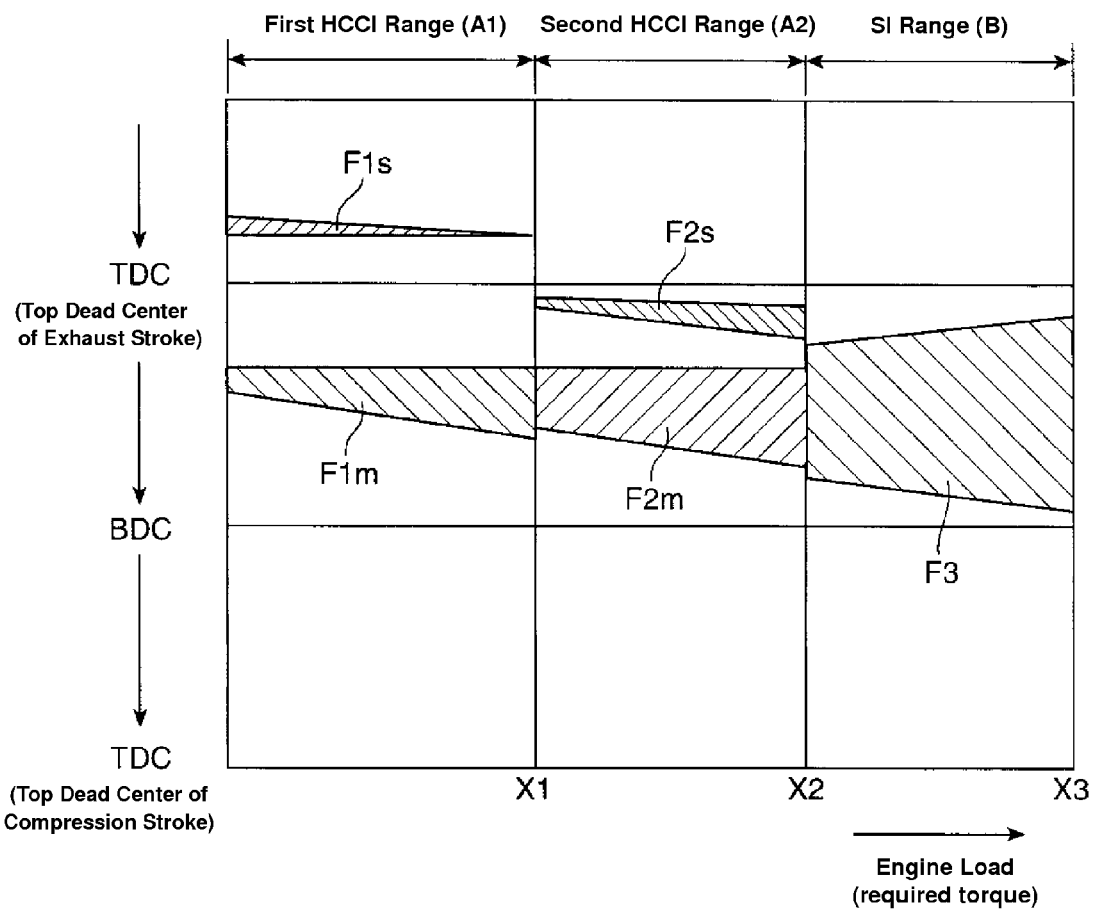
FIG. 6 is a diagram showing changes of the injection timing and the injection amount of fuel according to an engine load.

FIG. 6 is a diagram showing changes of the injection timing and the injection amount of fuel according to the engine load. Specifically, FIG. 6 shows how the injection timing and the injection amount of the fuel injected from the injector 18 change as the engine operating condition changes along a line L (an equal-engine speed line) in the control map of FIG. 3. Herein, in FIGS. 3 and 6, an engine-load point X1 shows a border value between the first HCCI range A1 and the second HCCI range A2, an engine-load point X2 shows a border value between the second HCCI range A2 and the SI range B, and an engine-load point X3 shows the maximum value (the highest engine-load point) of the engine load of the SI range B.

As shown in FIG. 6, in the first HCCI range A1 from the non-engine load to the engine-load point X1, the injection amount through the before-TDC injection F1s executed before the top dead center of the exhaust stroke decreases as the engine load increases, and the injection amount through the main injection F1m executed during the intake stroke increases as the engine load increases.

Herein, the reason for the injection amount through the before-TDC injection F1s decreasing as the engine load increases is that the compression self-ignition combustion (J1m in FIG. 4) by the main injection F1m tends to occur easily when the engine load is higher. That is, the purpose of the before-TDC injection F1s is to promote the second compression self-ignition combustion J1m by the main injection F1m by increasing the temperature inside the combustion chamber with the first compression self-ignition combustion J1s occurring near at the top dead center of the exhaust stroke by the before-TDC injection F1s. Herein, it is considered that as long as the engine load increases sufficiently, the temperature inside the exhaust chamber may increase properly and thereby the second combustion J1m may be caused surely even if the energy by the first combustion J1s is small. Considering this matter, the injection amount through the before-TDC injection F1s is set to decrease as the engine load increases in the present embodiment.

Contrary to the before-TDC injection F1s, the injection amount through the main injection F1m increases as the engine load increases. This is to generate the sufficient combustion energy according to the required torque by increasing the main injection amount as the engine load increases.

Further, in the second HCCI range A2 from the engine-load point X1 to the engine-load point X2 in FIG. 6, both the injection amount through the after-TDC injection F2s executed right after the top dead center of the exhaust stroke and the injection amount through the main injection F2m executed subsequently increase as the engine load increases.

Herein, the reason for the injection amount through the after-TDC injection F2s increasing as the engine load increases is that the temperature and the internal pressure inside the combustion chamber 6 increase so that the detonation, such as pre-ignition, tends to occur easily when the engine load is higher. That is, the purpose of the after-TDC injection F2s is to prevent the pre-ignition and the like at the time of the subsequent compression self-ignition combustion J2 by cooling down the inside of the combustion chamber 6 with the fuel's evaporation heat. Herein, it may be necessary that the inside of the combustion chamber is cooled down so sufficiently that the detonation can be prevented surely when the engine load is higher. Thus, according to the present embodiment, the injection amount through after-TDC injection F2s is set to increase as the engine load increases.

The injection amount through the main injection F2m is also set to increase as the engine load increases in order to generate the sufficient combustion energy according to the increase of the engine load.

As described, in each of the first HCCI range A1 and the second HCCI range A2 (in the range from the non-engine load to the engine-load point X2), the double injections of before-TDC injection F1s, the after-TDC injection F2s and the main injections F1m, F2m are executed, so that the compression self-ignition combustion is performed. Meanwhile, in the SI range B on the high-engine load side from the engine-load point X2, the combustion style is switched from the compression self-ignition combustion to the spark ignition combustion, so that the fuel is injected at one time through a fuel injection F3. Herein, the fuel injection F3 is executed during the intake stroke like the main injections F1m, F2m in the first and second HCCI ranges A1, A2, and its injection amount increases as the engine load increases.

Herein, respective values of the engine-load point X1 as the border between the first HCCI range A1 and the second HCCI range A2 and the engine-load point X2 as the border between the second HCCI range A2 and the SI range B are set to be variable depending on the temperature of the engine. For example, the engine-load point X1 as the border between the first and second HCCI ranges A1, A2 is set at a lower value when the engine cooling-water temperature detected by the cooling-water sensor 45 is higher. This is because when the cooling-water temperature is high, the temperature inside the combustion chamber 6 is so high that the self ignition tends to occur easily. Accordingly, it may be necessary to move on the second HCCI range A2 from a lower-engine load condition in order to cool down the inside of the combustion chamber 6 by the after-TDC injection F2s so that the compression self-ignition combustion can be performed.

Figure 7:
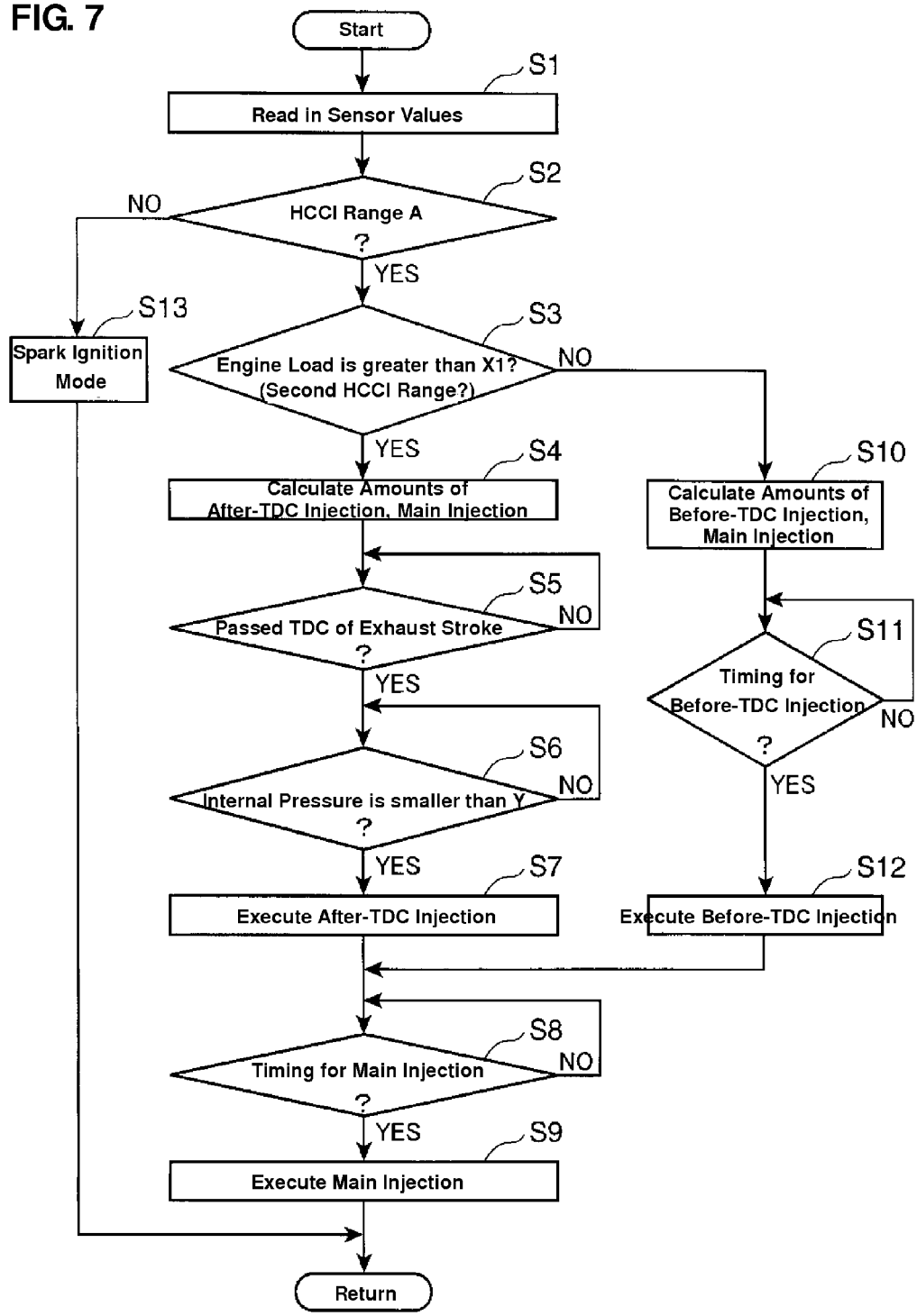
FIG. 7 is a flowchart showing steps of a control executed by PCM.

FIG. 7 is a flowchart showing steps of a control executed by the PCM 30. Regarding FIG. 7, the fuel injection control according to the engine operating condition will be described mainly. After the flowchart in FIG. 7 starts, various sensor values are read in (step S1). Specifically, the engine speed, intake-air amount, engine load (required torque), internal pressure and cooling-water temperature are read in based on the detection values of the crank-angle sensor 41, airflow sensor 42, accelerator-opening sensor 43, internal-pressure sensor 44, and water-temperature sensor 45.

Next, it is determined by the engine operating condition determining section 34 based on the sensor values read in the step S1 whether or not the current engine operating condition (engine load, engine speed) is in the HCCI range A of the control map in FIG. 3 (step S2).

When it is determined that the current engine operating condition is in the HCCI range A, that is, the answer to the step S2 is YES, it is determined by the engine operating condition determining section 34 whether the current engine load (required load) is greater than the specified value X1 in FIG. 3 or not, that is, whether the current engine operating condition is in the second HCCI range A2 or not (step S3). Herein, as described above, the specified value (engine load point) X1 is set to be the lower value when the cooling-water temperature detected in the step S1 is higher Meanwhile, it is determined that the current engine operating condition is in the S1 range B, that is, the answer to the step S2 is NO, the control sequence proceeds to step S13, where the combustion by the spark ignition with the ignition plug 16 is executed (spark ignition mode).

When it is determined that the current engine operating condition is in the second HCCI range A2, that is, the answer to the step S3 is YES, a calculation of the amount of fuel to be injected through the after-TDC injection F2s and the main injection F2m shown in FIGS. 5 and 6 is executed based on the engine load and others (step S4).

Subsequently, it is determined based on the detection value of the crank-angle sensor 41 obtained in the step S1 whether the piston 5 has passed the top dead center of the exhaust stroke or not (step S5). When the answer is YES, it is determined based on the detection value of the internal pressure sensor 44 whether the current internal pressure has decreased below the specified pressure Y or not (step S6).

When it is determined that the current internal pressure is smaller than the specified pressure Y, that is, the answer to the step S6 is YES, a control of the fuel injection with the amount (the fuel amount of the after-TDC injection calculated in the step S4) from the injector 18 as the after-TDC injection F2s is executed by the injector control section 31 (step S7).

Subsequently, it is determined based on the detection value of the crank-angle sensor 41 obtained in the step S1 whether or not it is the timing to execute the main injection F2m (step S8). When the answer is YES here, a control of the fuel injection with the amount (the main injection fuel amount calculated in the step S4) from the injector 18 as the main injection F2m is executed by the injector control section 31 (step S9).

Next, a control when the engine operating condition is in the first HCCI range A1, that is, when the answer is NO to the step S3, will be described. Herein, a calculation of the amount of fuel to be injected through the before-TDC injection F1s and the main injection F1m shown in FIGS. 4 and 6 is executed based on the engine load and others (step S10).

Subsequently, it is determined based on the detection value of the crank-angle sensor 41 obtained in the step S1 whether or not it is currently the timing to execute the before-TDC injection F1s (step S11). For example, the execution timing of the before-TDC injection F1s may be determined at the timing when the piston 5 has gone up to a point which is a specified angle before the top dead center of the exhaust stroke.

When the answer is YES to the step S11, a control of the fuel injection with the amount (the before-TDC injection fuel amount calculated in the step S10) from the injector 18 as the before-TDC injection F1s is executed by the injector control section 31 (step S12). After this, the control sequence proceeds to the above-described steps S8, S9, where the control of the execution of the main injection F1m at the specified timing is executed.

As described above, according to the present invention, when it is determined that the engine operating condition is in the second HCCI range A2 where the engine load is higher than the specified load X1 within the HCCI range A where the compression self-ignition combustion is performed, the after-TDC injection F2s is executed at the point T1 when the internal pressure of the combustion chamber drops below the specified pressure Y after the top dead center of the exhaust stroke during the minus valve overlap period NVO during which the intake and exhaust valves 11, 12 are both closed. Then, the main injection F2m as the main injection is executed. Thereby, any occurrence of detonation or any increase of NOx emission, which may be caused by the compression self-ignition combustion performed in the high-engine load range, can be effectively prevented.

That is, according to the above-described embodiment, since the after-TDC injection F2s is executed when the internal pressure of the combustion chamber drops to the certain degree after the exhaust top dead center, the injected fuel (gasoline) evaporates without combusting, so that the inside of the combustion chamber 6 of the cylinder 2 is cooled down properly by its evaporation heat. Then, the main injection F2m is executed subsequently under this state of the cooled combustion chamber. Thereby, any improper detonation, such as pre-ignition, can be effectively prevented in the second HCCI range A2 where the engine load is relatively high by restraining the ignitability of the air-fuel mixture properly. Further, since the above-described cooling down of the inside of the combustion chamber by the after-TDC injection F2s promotes the reduction of the internal pressure thereby the induction of the intake air, the induction volumetric efficiency improves, so that the combustion temperature decreases so properly that the NOx emission can improve.

Especially, according to the above-described embodiment, since the amount of fuel injected through the after-TDC injection F2s is set to increase as the engine load becomes higher as shown in F1G. 6, the cooling function by the after-TDC injection F2s can be improved in the high-engine load range where the temperature and internal pressure of the combustion chamber 6 may increase, so that any detonation or any increase of NOx emission in the high-engine load range can be effectively prevented.

Further, since the above-described specified load X1 and the specified pressure Y are set to be lower values respectively as the engine-cooling water temperature becomes higher, the execution timing of the after-TDC injection F2s can be adjusted properly according to the temperature condition of the engine, so that the detonation can be effectively prevented by performing the proper cooling function by the after-TDC injection F2s.

That is, since the second HCCI range A2 where the after-TDC injection F2s is executed can be enlarged toward the low-engine load side by decreasing the above-described specified load X1 when the engine-cooling water temperature is high, the after-TDC injection F2s is started from the relatively-low engine load stage so that the inside the combustion chamber 6 of the cylinder 2 can be cooled down. Thereby, the prevention of the detonation or the like can be achieved properly even when the engine temperature is so high that the self ignition of the air-fuel mixture tends to occur easily. Further, since the start timing of the after-TDC injection F2s in the combustion cycle is delayed from the top dead center of the exhaust stroke by decreeing the above-described specified pressure Y when the cooling-water temperature is so high that the self ignition of the air-fuel mixture tends to occur easily, it can be avoided that the temperature inside the combustion chamber increases by the combustion reaction of the fuel injected. Thereby, the cooling function by the after-TDC injection F2s in the second TDC range A2 can be performed surely.

Moreover, according to the above-described embodiment, when it is determined that the engine operating condition is in the first HCCI range A1 which is located on the lower-engine load side from the second HCCI range A2, the before-TDC injection F1s is executed at the point before the top dead center of the exhaust stroke during the minus valve overlap period NVO, and then the main injection F1m is executed. Thereby, even in a situation in which the engine load is relatively low so that the self ignition tends not to occur easily, the auxiliary combustion J1s (FIG. 4) which is caused by the after-TDC injection F1s can increase the temperature inside the combustion chamber 6. Accordingly, the compression self-ignition combustion J1m caused by the subsequent main injection F1m can be effectively promoted, so that the combustion stability can be further improved.

Especially, since the amount of fuel injected through the before-TDC injection F1s is set to decrease as the engine load becomes higher as shown in FIG. 6, the combustion energy produced by the before-TDC injection F1s is decreased according to the engine load. Thereby, the promotion of combustion with the high temperature inside the combustion chamber can be achieved at an appropriate level according to the engine load, so that the combustion stability in the first HCCI range A1 can be ensured properly.

The present invention should not be limited to the above-descried embodiment, and any other modifications or improvements may be applied within the scope of a spirit of the present invention.

For example, while the execution timing of the after-TDC injection F2s in the second HCCI range A2 is set at the point T1 when the internal pressure of the combustion chamber drops below the specified pressure Y after the top dead center of the exhaust stroke during the minus valve overlap period NVO in the above-described embodiment, a concrete means for specifying this point T1 should not be limited to something based on the detection value of the internal-pressure sensor 44 like the above-described embodiment. For example, the air-induction volume from the detection value of the airflow sensor 42, the engine speed from the detection value of the crank-angle sensor 41, or the temperature of the exhaust gas from a detection value from an exhaust-gas temperature, not illustrated, may be obtained, and the above-described point T1 may be determined based on the engine operation condition which is specified by these obtained states.

Further, while the switch from the before-TDC injection F1s to the after-TDC injection F2s is conducted soon after the engine load exceeds the engine-load point X1 which is an upper limit of the first HCCI range A1 in the above-described embodiment, some range where none of the before-TDC injection F1s or the after-TDC injection F2s is executed (that is, only the main injection is executed) may be provided between the first HCCI range A1 and the second HCCI range A2.

The above-described embodiment shows an example in which the present invention is applied to a direct injection type of gasoline engine in which the gasoline fuel is directly injected into the combustion chamber 6 of each cylinder 2 from the injector 18. However, the present invention is also applicable properly to a port injection type of gasoline engine in which the fuel is injected into the intake port 9.

What is claimed is:

1. A control method of an engine which has a homogeneous-charge-compression-ignition combustion mode in which a premixed air-fuel mixture is compressed in a combustion chamber so that a self-ignition of the mixture is performed without requiring spark from a spark plug, and a minus valve overlap period during which an intake valve and an exhaust valve are both closed at a transitional time from an exhaust stroke to an intake stroke, the method comprising:
   determining a high-engine load range where an engine load is higher than a specified load in the homogeneous-charge-compression-ignition combustion mode;
   executing a first fuel injection from a fuel injector in said high-engine load range at a point when an internal pressure of the combustion chamber drops below a specified pressure after the top dead center of the exhaust stroke during the minus valve overlap period;
   executing a second fuel injection from the fuel injector in said high-engine load range at a point after an execution timing of said first fuel injection;
   determining a low-engine load range where the engine load is lower than said specified load in the homogeneous-charge-compression-ignition combustion mode;
   executing a first fuel injection from the fuel injector in said low-engine load range at a point before the top dead center of the exhaust stroke during the minus valve overlap period; and
   executing a second fuel injection from the fuel injector in said low-engine load range at a point after an execution timing of said first fuel injection.

2. The control method of an engine of claim 1, wherein the amount of fuel injected through said first fuel injection in the high-engine load range is set to increase as the engine load becomes higher.

3. The control method of an engine of claim 1, wherein said specified load of the engine load and said specified pressure of the internal pressure of the combustion chamber are set to be lower values respectively as the temperature of cooling water of the engine becomes higher.

4. The control method of an engine of claim 1, wherein the amount of fuel injected through said first fuel injection in the low-engine load range is set to decrease as the engine load becomes higher.

5. The control method of an engine of claim 1, wherein the amount of fuel injected through said second fuel injection in the high-engine load range is greater than that of the amount of fuel injected through said first fuel injection in the high-engine load range.

6. A control system of an engine which has a homogeneous-charge-compression-ignition combustion mode in which a premixed air-fuel mixture is compressed in a combustion chamber so that a self-ignition of the mixture is performed without requiring spark from a spark plug, and a minus valve overlap period during which an intake valve and an exhaust valve are both closed at a transitional time from an exhaust stroke to an intake stroke, the system comprising:
   a fuel injector to inject fuel into the combustion chamber;
   a sensor to detect an engine-load operating condition;
   a sensor to detect an internal pressure of the combustion chamber; and
   a controller to determine a high-engine load range where an engine load detected by said engine-load operating condition detecting sensor is higher than a specified load in the homogeneous-charge-compression-ignition combustion mode, and control an execution of a fuel injection from said fuel injector, wherein said controller executes a first fuel injection from the fuel injector in the high-engine load range at a point when the internal pressure of the combustion chamber detected by said internal pressure detecting sensor drops below a specified pressure after the top dead center of the exhaust stroke during the minus valve overlap period, and executes a second fuel injection from the fuel injector in the high-engine load range at a point after an execution timing of said first fuel injection, wherein said controller is further configured to determine a low-engine load range where the engine load detected by the engine-load operating condition detecting sensor is lower than said specified load in the homogeneous-charge-compression-ignition combustion mode, and to execute a first fuel injection from the fuel injector in said low-engine load range at a point before the top dead center of the exhaust stroke during the minus valve overlap period, and to execute a second fuel injection from the fuel injector in said low-engine load range at a point after an execution timing of said first fuel injection.

7. The control system an engine of claim 6, wherein the amount of fuel injected through said first fuel injection in the high-engine load range is set to increase as the engine load becomes higher.

8. The control system of an engine of claim 6, wherein said specified load of the engine load and said specified pressure of the internal pressure of the combustion chamber are set to be lower values respectively as the temperature of cooling water of the engine becomes higher.

9. The control system of an engine of claim 6, wherein the amount of fuel injected through said first fuel injection in the low-engine load range is set to decrease as the engine load becomes higher.

10. The control system of an engine of claim 6, wherein the amount of fuel injected through said second fuel injection in the high-engine load range is greater than that of the amount of fuel injected through said first fuel injection in the high-engine load range.

* * * * *